United States Patent [19]

Shiraishi

[11] Patent Number: 5,203,028
[45] Date of Patent: Apr. 13, 1993

[54] AUTOMATIC ADJUSTMENT RADIO APPARATUS

[75] Inventor: Mitsuo Shiraishi, Tokyo, Japan

[73] Assignee: Hitachi Denshi Kabushiki Kaisha, Tokyo, Japan

[21] Appl. No.: 591,066

[22] Filed: Oct. 1, 1990

[30] Foreign Application Priority Data

Oct. 5, 1989 [JP] Japan .................................. 1-258890

[51] Int. Cl.$^5$ .......................... H04B 17/02; H04B 1/16
[52] U.S. Cl. ................................ 455/154.1; 455/186.1; 455/200.1
[58] Field of Search ............... 455/186.1, 186.2, 160.1, 455/154.1, 154.2, 170.1, 175.1, 177.1, 185.1, 184.1, 230, 343, 200.1; 369/19, 20

[56] References Cited

U.S. PATENT DOCUMENTS 4,389,732 6/1983 Sasahara et al. ..................... 455/170
4,593,414 6/1986 Koyanogi ............................ 455/186

FOREIGN PATENT DOCUMENTS 61-59907 3/1986 Japan .................................. 455/186
154943 3/1989 Japan .................................. 455/186
0301770 1/1989 World Int. Prop. O. .......... 455/186

Primary Examiner—Reinhard J. Eisenzopf
Assistant Examiner—Lisa Charouel
Attorney, Agent, or Firm—Blakely, Sokoloff, Taylor & Zafman

[57] ABSTRACT

An automatic adjustment radio apparatus includes a transfer destination selecting unit and a data transfer unit. The transfer destination selecting unit selects a transfer destination of data set by a channel switch. The data transfer unit transfers the data set by the channel switch to a specific electronic volume and a specific address of a non-volatile memory selected by the transfer destination selecting unit. The data set by the channel switch is used as data to be set in the electronic volume and to be stored in the non-volatile memory upon adjustment.

2 Claims, 4 Drawing Sheets

AUTOMATIC ADJUSTMENT RADIO APPARATUS

BACKGROUND OF THE INVENTION

The present invention relates to an automatic adjustment radio apparatus capable of automatically adjusting operation specifications.

Although adjustment is performed by rotating a volume by using a screwdriver in conventional radio apparatuses, many advanced radio apparatuses perform adjustment by means of a computer in recent years. For example, as shown in FIG. 4, a computer 2 supplies predetermined data to an automatic adjustment radio apparatus 3 in accordance with an input from a keyboard 1, and the automatic adjustment radio apparatus 3 performs a predetermined operation in accordance with the supplied data. An operation state of the automatic adjustment radio apparatus 3 is measured by a measuring unit 4 connected to a measuring unit connection terminal 21, and the measurement result is supplied to the computer 2. The computer 2 supplies data to be adjusted to the automatic adjustment radio apparatus 3 in accordance with the measured data, thereby adjusting the automatic adjustment radio apparatus 3.

FIG. 5 is a block diagram showing the automatic adjustment radio apparatus. Referring to FIG. 5, a signal from a computer is supplied to a processor 7 via a communication interface I/O terminal 5 and a communication interface 6. The processor 7 causes an EEPROM 8 to store the supplied data and supplies required data to electronic volumes $9_1$ to $9_n$ and a frequency synthesizer 11 in accordance with the contents of the stored data. The electronic volumes $9_1$ to $9_n$ perform oscillation frequency adjustment, modulation factor adjustment, transmission output adjustment, and the like of an RF transmitter/receiver 12. In accordance with the data supplied from the computer 2, the frequency synthesizer 11 outputs a signal having a predetermined frequency to the RF transmitter/receiver 12. The frequency of the signal obtained from the frequency synthesizer 11 is a transmission frequency and a local oscillation frequency.

The EEPROM 8 also stores, in addition to the adjustment data for the electronic volumes $9_1$ to $9_n$, data for controlling an output signal frequency of the frequency synthesizer 11 corresponding to the transmission/reception frequency of each channel. A transmission/reception frequency of each channel input from the keyboard 1 is stored in the EEPROM 8 via the computer 2, the communication interface 6, and the processor 7. When a channel switch 13 is switched to the right in FIG. 5, a counter 14 counts up. When the channel switch 13 is switched to the left in FIG. 5, the counter 14 counts down. The processor 7 supplies the value of the counter 14 to a display unit 15 to display the value as a channel number. The processor 7 also has a function of supplying the data for controlling the output frequency of the frequency synthesizer 11 corresponding to the transmission/reception frequency of the channel stored in the EEPROM 8 to the frequency synthesizer 11. A monitor switch 16 is used to monitor the AF signals when muted by the CTCSS (continuous tone controlled squelch system) in the RF transmitter/receiver 12.

When a power source of this apparatus is switched off and then switched on again, the processor 7 supplies the adjustment data stored in the EEPROM 8 to the electronic volumes $9_1$ to $9_n$, thereby resetting the volumes.

In the conventional apparatus having the above arrangement, however, setting and adjustment of electronic volumes are performed by a computer via a communication interface. Therefore, readjustment cannot be performed where no computer is available.

SUMMARY OF THE INVENTION

It is an object of the present invention to provide an automatic adjustment radio apparatus which can easily perform adjustment without using a computer and can stably operate after the adjustment.

In order to achieve the above object of the present invention, there is provided an automatic adjustment radio apparatus which performs channel selection by using a channel switch, sets predetermined data in a plurality of electronic volumes to set characteristics of the radio apparatus, and stores the set data in a non-volatile memory, comprising transfer destination selecting means for selecting a transfer destination of the data set by the channel switch, and data transfer means for transferring the data set by the channel switch to a specific electronic volume and a specific address of the non-volatile memory selected by the transfer destination selecting means, wherein the data set by the channel switch is used as data to be set in the electronic volume and to be stored in the non-volatile memory upon adjustment.

DETAILED DESCRIPTION OF THE PREFERRED EMBODIMENT

Figure 1:
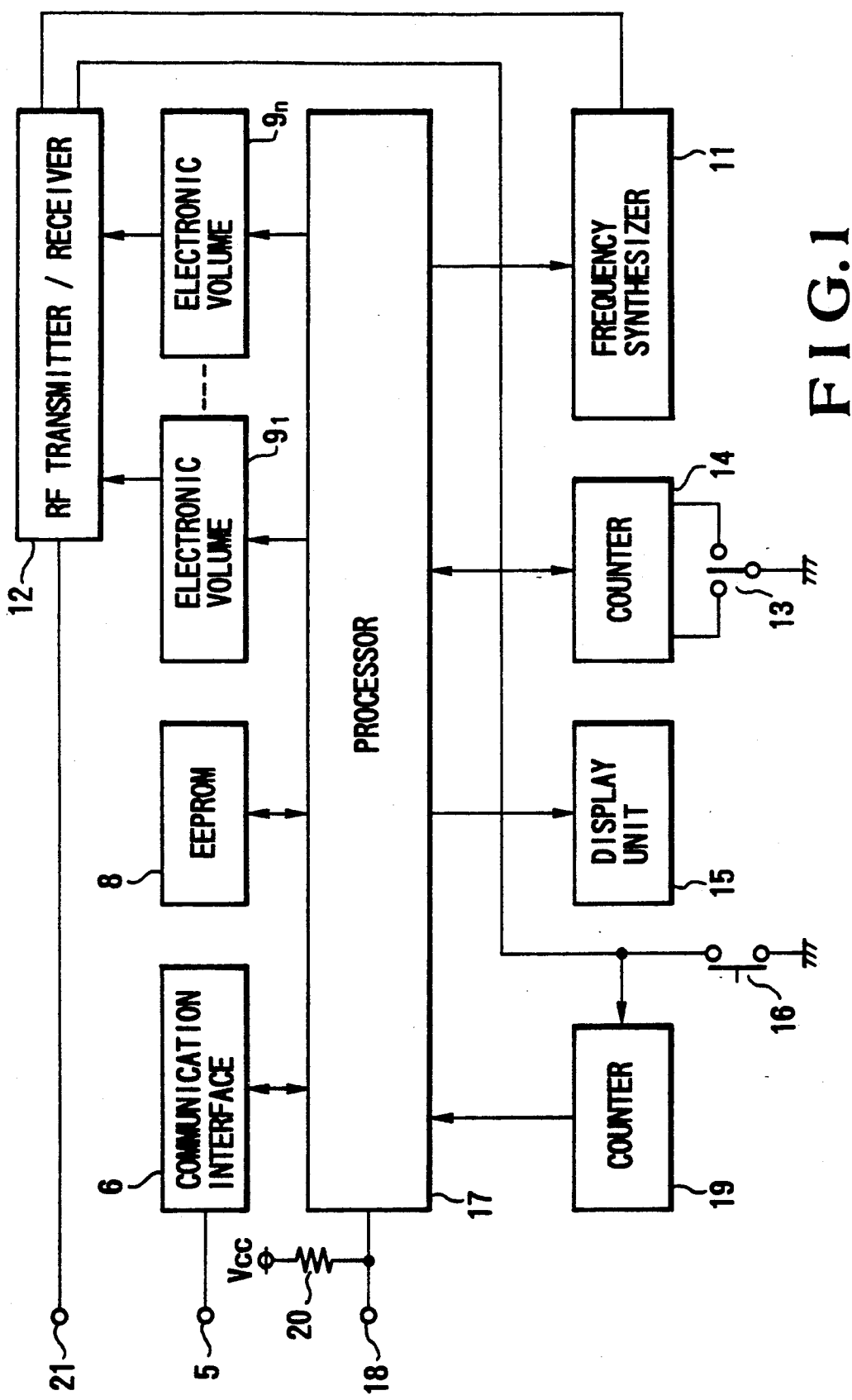
FIG. 1 is a block diagram showing an automatic adjustment radio apparatus according to an embodiment of the present invention.
Figure 2:
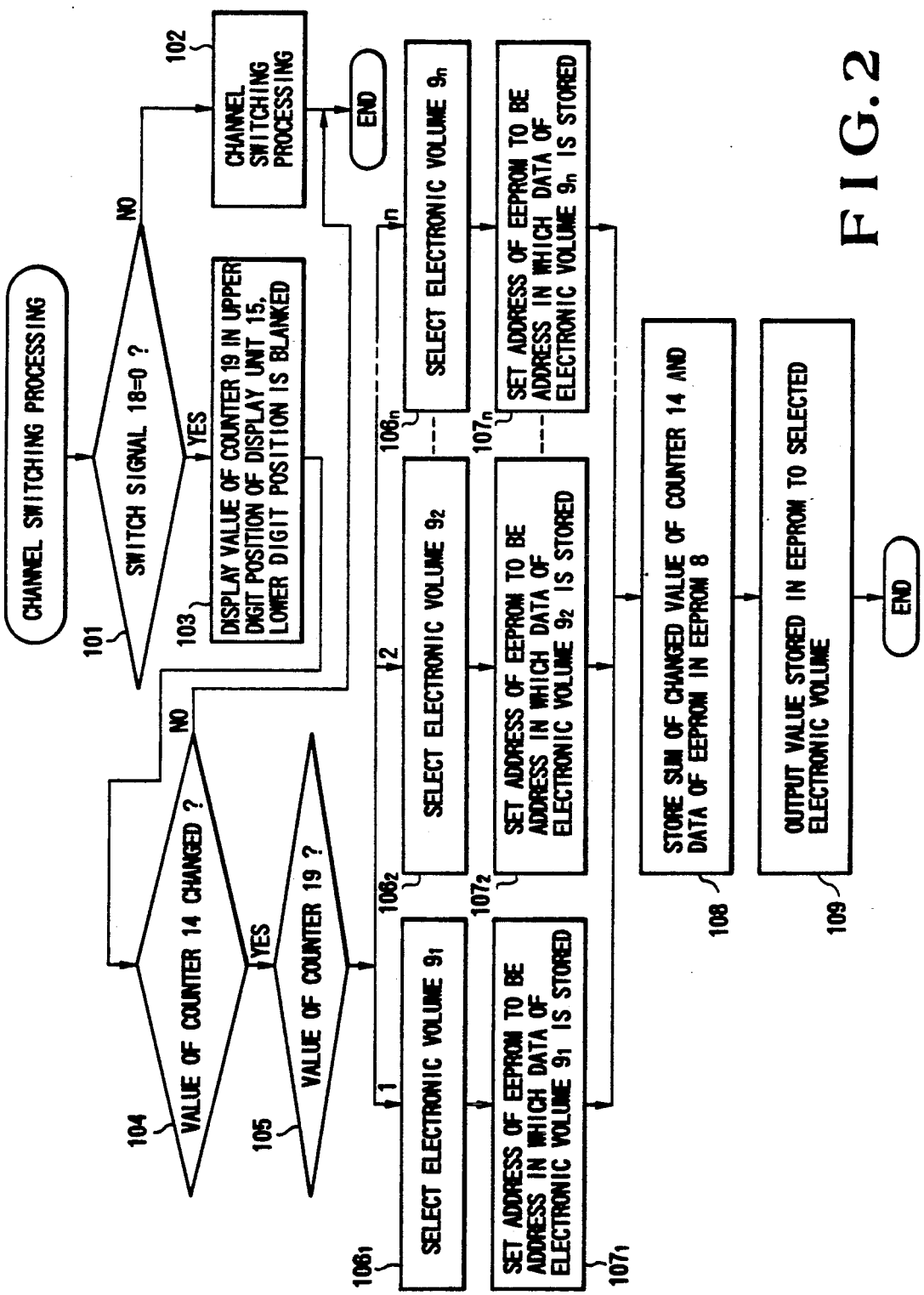
FIG. 2 is a flow chart for explaining an operation of the apparatus shown in FIG. 1.
Figure 3:
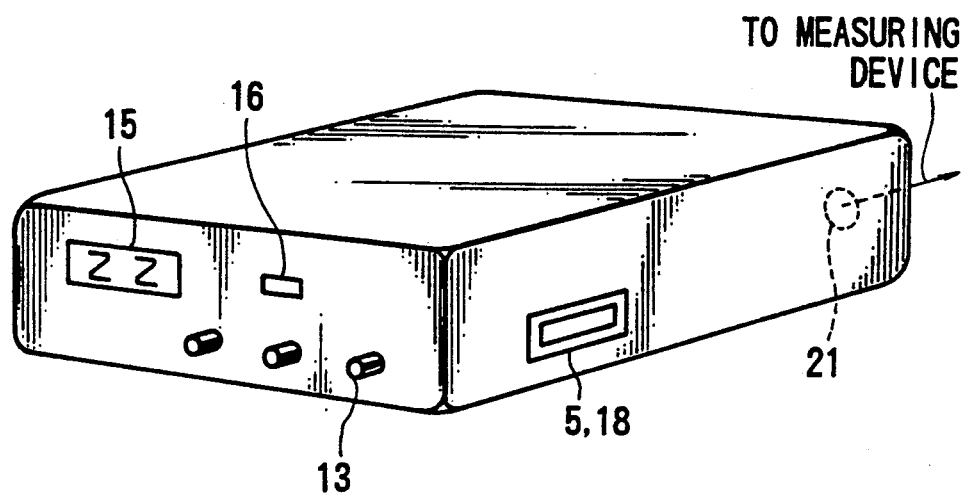
FIG. 3 is a perspective view showing a practical arrangement of the apparatus shown in FIG. 1.
Figure 4:
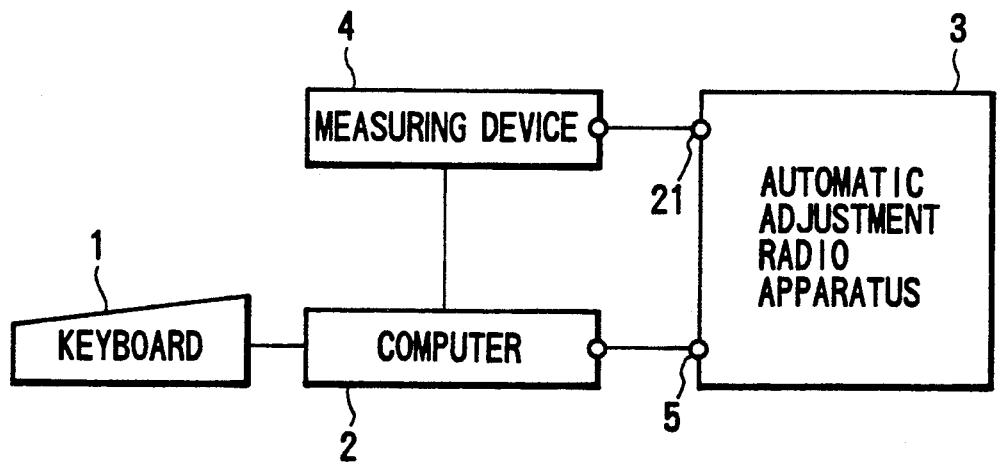
FIG. 4 is a block diagram showing a conventional apparatus which performs automatic adjustment by using a computer.
Figure 5:
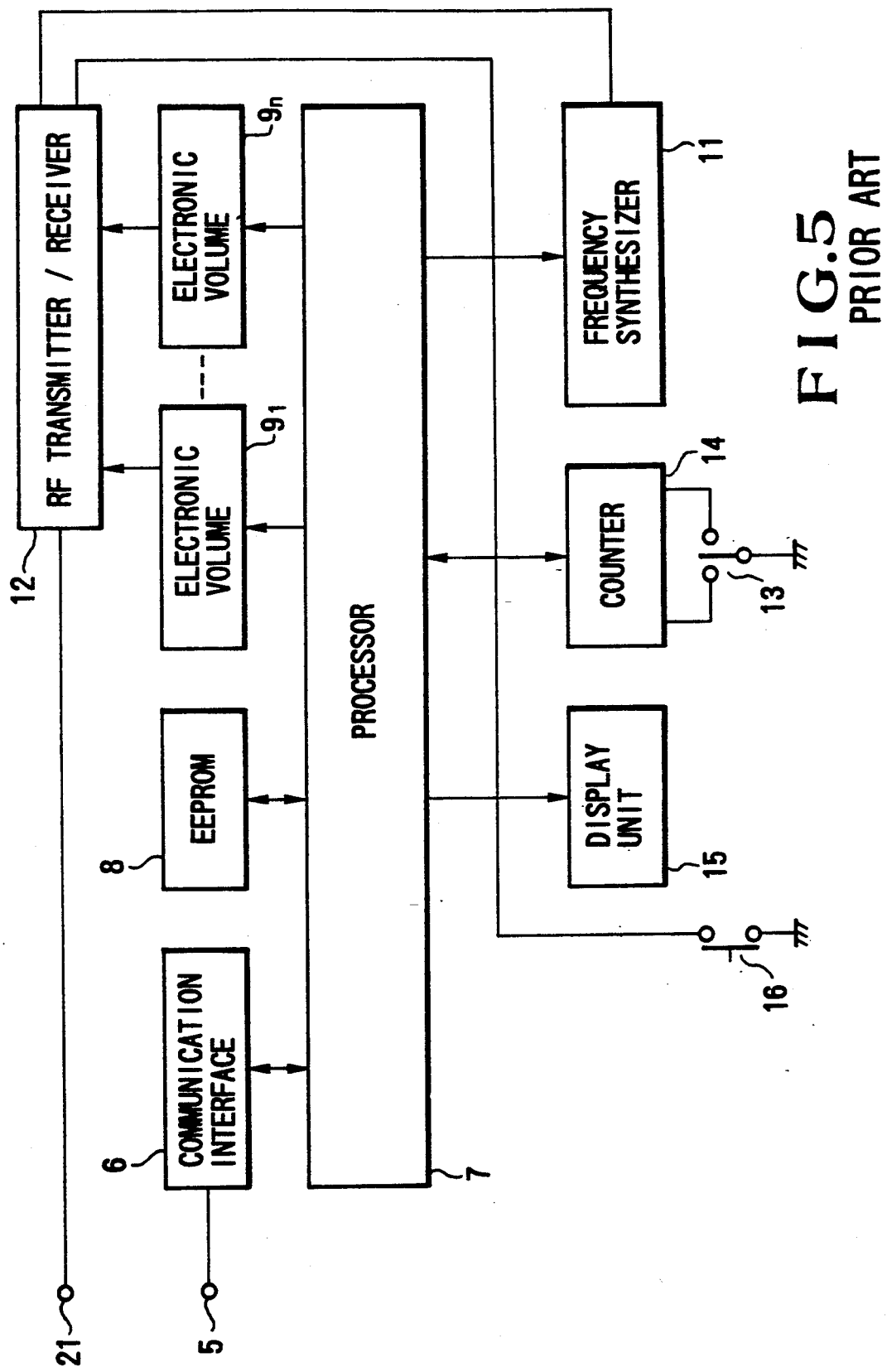
FIG. 5 is a block diagram showing the conventional apparatus shown in FIG. 4.

FIGS. 1 to 3 show an embodiment of an automatic adjustment radio apparatus according to the present invention, in which reference numeral 16 denotes a monitor switch; 17, a processor; 18, a switch signal input terminal; and 19, a counter. The counter 19 is counted up when the monitor switch 16 is operated. The processor 17 processes the value of a counter 14 as a value to be set in electronic volumes when the switch signal input terminal 18 is grounded and processes it as a channel number when the terminal 18 is released from the ground. Reference numeral 20 denotes a pull-up resistor.

An operation of the apparatus having the above arrangement will be described with reference to FIG. 2. In step 101 shown in FIG. 2, if the switch signal input terminal 18 is not connected to the ground, the processor 17 processes the value of the counter 14 as a channel number in step 102, and this operation is the same as that performed in conventional apparatuses.

If the switch signal input terminal 18 is connected to the ground in step 101, the processor 17 executes volume setting processing from step 103.

In step 103, the value of the counter 19 is displayed in an upper digit position of a display unit 15, and its low digit position is kept blanked. This processing is performed in order to display a selected electronic volume when an electronic volume maximum number $n \neq 1$. Note that the lower digit position is blanked in order to distinguish the channel number.

Subsequently, a change in value of the counter 14 is checked in step 104. If no change is found in the value for a predetermined time period, the volume setting processing is ended.

If the value of the counter 19 is changed, the flow advances to step 105. In step 105, the value of the counter 19 is checked, and the value is selected in each of steps $106_1$ to $106_n$. For example, if an electronic volume $9_1$ is selected, an address of an EEPROM 8 is set to an address in which data of the electronic volume $9_1$ is stored in step $107_1$. In each of steps $107_2$ to $107_n$, the same processing as in step $107_1$ is performed for the EEPROM 8 when a corresponding one of electronic volumes $9_2$ to $9_n$ is selected. The flow advances to step 108, and a sum of the changed value of the counter 14 and the data of the EEPROM 8 is stored in the EEPROM 8. The flow advances to step 109, the value stored in the EEPROM 8 is output to the selected electronic volume, and the volume setting processing is ended. In other words, in steps $107_1$ to $107_n$, one of the electronic volumes $9_1$ to $9_n$ is selected in accordance with the value of the counter 19, and one of addresses of the EEPROM 8 which stores data to be set in the electronic volumes $9_1$ to $9_n$ is selected. The processor 17 determines that the value of the counter 14 is data to be set in an electronic volume and the EEPROM and transfers the value of the counter 14 to the electronic volume and the address of the EEPROM selected in step 108. If the value of the counter 19 is "1", for example, the value of the counter 14 is transferred to the electronic volume $9_1$.

After the above volume setting processing is ended, the electronic volume $9_1$ supplies a resistance corresponding to the transferred value of the counter 14 to a modulation factor adjusting circuit of an RF transmitter/receiver 12.

Similarly, if the value of the counter 19 is n, the value of the counter 14 is transferred to the electronic volume $9_n$. The electronic volume $9_n$ supplies a resistance corresponding to the transferred value of the counter 14 to a corresponding adjusting circuit of the RF transmitter/receiver 12.

In the radio apparatus having the above arrangement, if the switch signal input terminal 18 is extracted outside the apparatus, adjustment can be performed with its cover closed. Since a conventional apparatus is adjusted by using a screwdriver, its cover must be opened during adjustment. Therefore, the characteristics of the apparatus change in accordance with the presence/absence of the cover. Since, however, the radio apparatus of the present invention can be adjusted with its cover closed, no change is caused in characteristics between adjustment and setting of the apparatus.

The present invention is not limited to the above embodiment but can be variously modified as follows. That is, the processor 17 may be connected directly to the monitor switch 16 without using the counter 19, thereby selecting up to two electronic volumes. In addition, several switches may be additionally used to select electronic volumes without using the counter 19. Furthermore, an external input terminal may be used without connecting a switch and may be connected to the ground through a jumper line upon adjustment. Note that the apparatus can be used more easily by adding the function of displaying the value operated by the monitor switch 16 and a channel switch 13 on the display unit 15 to the processor.

As has been described above, according to the present invention, since adjustment of each section of a radio apparatus can be performed by a channel switch, the adjustment can be performed without using a computer upon maintenance service. In addition, by extracting a switch signal input terminal outside the radio apparatus, the adjustment can be performed without opening a cover of the radio apparatus. Therefore, the adjustment can be easily performed, and no change is caused in characteristics due to the presence/absence of the cover after the adjustment is completed, thereby realizing a stable operation.

What is claimed is:

1. An automatic adjustment radio apparatus which, in a first operating mode, performs channel selection by using a channel switch, and which, in a second operating mode, supplies predetermined data to a plurality of electronic volumes through a communication interface to adjust characteristics of said radio apparatus, and stores the data in a non-volatile memory for permitting, after disconnection of a power source, the restoration of the characteristics of the radio apparatus before the power source disconnection by supplying to the plurality of electronic volumes the data that is stored in the nonvolatile memory, said apparatus comprising:

transfer destination selecting means for selecting a transfer destination of the data, said data determined by said channel switch operating in said second operating mode; and data transfer means for transferring the data to a specific electronic volume and a specific address of said non-volatile memory selected by said transfer destination selecting means, wherein the data is supplied to said electronic volume and stored in said non-volatile memory upon adjustment.

2. The apparatus according to claim 1, wherein said transfer destination selecting means further includes a counter, and a switch for causing said counter to count up to manually select the specific address of said non-volatile memory to which the data is to be transferred.

* * * * *